United States Patent
Thornburgh et al.

(10) Patent No.: US 9,300,733 B2
(45) Date of Patent: Mar. 29, 2016

(54) SYSTEM AND/OR METHOD FOR CLIENT-DRIVEN SERVER LOAD DISTRIBUTION

(75) Inventors: Michael Thornburgh, San Jose, CA (US); Matthew Kaufman, Santa Cruz, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 0 days.

(21) Appl. No.: 13/305,693

(22) Filed: Nov. 28, 2011

(65) Prior Publication Data

US 2012/0278493 A1    Nov. 1, 2012

Related U.S. Application Data

(62) Division of application No. 11/757,126, filed on Jun. 1, 2007, now Pat. No. 8,069,251.

(51) Int. Cl.
*G06F 15/16* (2006.01)
*G06F 15/173* (2006.01)
*H04L 29/08* (2006.01)

(52) U.S. Cl.
CPC .......... *H04L 67/1008* (2013.01); *H04L 67/101* (2013.01); *H04L 67/1002* (2013.01)

(58) Field of Classification Search
CPC .............. H04L 67/101; H04L 67/1002; H04L 67/1008
USPC .......... 709/227, 228, 229, 201, 202, 240, 241
See application file for complete search history.

(56) References Cited

U.S. PATENT DOCUMENTS

| | | | |
|---|---|---|---|
| 4,475,192 A | | 10/1984 | Fernow et al. |
| 4,686,669 A | * | 8/1987 | Chang ................ H04Q 11/0407 370/375 |
| 4,686,701 A | * | 8/1987 | Ahmad .............. H04Q 11/0407 379/211.03 |
| 4,689,815 A | * | 8/1987 | Grewal .............. H04Q 11/0407 379/269 |
| 4,694,487 A | * | 9/1987 | Chang ................ H04Q 11/0407 379/269 |
| 5,247,665 A | * | 9/1993 | Matsuda ........... G06F 17/30595 |
| 5,506,968 A | | 4/1996 | Dukes |
| 5,774,660 A | | 6/1998 | Brendel et al. |
| 5,799,002 A | | 8/1998 | Krishnan |
| 5,857,072 A | | 1/1999 | Crowle |
| 5,938,732 A | | 8/1999 | Lim et al. |
| 5,960,404 A | | 9/1999 | Chaar et al. |
| 6,032,175 A | | 2/2000 | Fletcher et al. |
| 6,205,481 B1 | | 3/2001 | Heddaya et al. |
| 6,280,991 B1 | * | 8/2001 | Raines ..................... C12N 9/22 424/94.6 |

(Continued)

FOREIGN PATENT DOCUMENTS

| CA | 2331046 | 7/2002 |
|---|---|---|
| JP | 2000-151601 | 5/2000 |

OTHER PUBLICATIONS

Salowey et al., "Transport Layer Security (TLS) Session Resumption without Server-Side State", Network Working Group, Internet-Draft, May 26, 2009, 18 pages.

(Continued)

*Primary Examiner* — Hieu Hoang
(74) *Attorney, Agent, or Firm* — Finch & Maloney PLLC

(57) ABSTRACT

The subject matter disclosed herein relates to communication between a client and a server in a communications network. In one particular example, a server is selected from a plurality of servers to provide a resource and/or a service to a client.

20 Claims, 3 Drawing Sheets

(56) References Cited

U.S. PATENT DOCUMENTS

| | | | |
|---|---|---|---|
| 6,405,236 B1 | 6/2002 | Nieratschker | |
| 6,516,350 B1 | 2/2003 | Lumelsky et al. | |
| 6,563,793 B1 | 5/2003 | Golden et al. | |
| 6,567,802 B1* | 5/2003 | Popa | G06F 17/30463 |
| 6,578,077 B1 | 6/2003 | Rakoshitz et al. | |
| 6,631,118 B1 | 10/2003 | Jones | |
| 6,658,473 B1 | 12/2003 | Block et al. | |
| 6,725,272 B1 | 4/2004 | Susai et al. | |
| 6,766,348 B1 | 7/2004 | Combs et al. | |
| 6,788,827 B1* | 9/2004 | Makram-Ebeid | G06T 7/2033 |
| | | | 382/276 |
| 6,798,786 B1 | 9/2004 | Lo et al. | |
| 6,925,482 B2 | 8/2005 | Gopal et al. | |
| 6,970,925 B1 | 11/2005 | Springmeyer et al. | |
| 7,039,916 B2 | 5/2006 | Jason, Jr. | |
| 7,058,804 B1* | 6/2006 | Akashika | G06Q 20/341 |
| | | | 235/376 |
| 7,111,162 B1 | 9/2006 | Bagepalli et al. | |
| 7,246,356 B1 | 7/2007 | Lozben et al. | |
| 7,274,706 B1 | 9/2007 | Nguyen et al. | |
| 7,305,486 B2 | 12/2007 | Ghose et al. | |
| 7,403,945 B2 | 7/2008 | Lin et al. | |
| 7,490,162 B1* | 2/2009 | Masters | 709/238 |
| 2001/0032263 A1 | 10/2001 | Gopal et al. | |
| 2001/0042131 A1 | 11/2001 | Mathon et al. | |
| 2002/0042828 A1 | 4/2002 | Peiffer | |
| 2002/0049815 A1 | 4/2002 | Dattatri | |
| 2002/0062375 A1 | 5/2002 | Teodosiu et al. | |
| 2002/0062454 A1 | 5/2002 | Fung | |
| 2002/0065930 A1 | 5/2002 | Rhodes | |
| 2002/0085714 A1* | 7/2002 | Inoha | G06F 21/10 |
| | | | 380/201 |
| 2002/0107935 A1 | 8/2002 | Lowery et al. | |
| 2002/0111133 A1* | 8/2002 | Wittkotter | G06F 21/6218 |
| | | | 455/1 |
| 2002/0112058 A1 | 8/2002 | Weisman et al. | |
| 2002/0120744 A1 | 8/2002 | Chellis et al. | |
| 2002/0129159 A1 | 9/2002 | Luby et al. | |
| 2002/0133593 A1 | 9/2002 | Johnson et al. | |
| 2002/0138618 A1 | 9/2002 | Szabo | |
| 2002/0150094 A1 | 10/2002 | Cheng et al. | |
| 2002/0174219 A1 | 11/2002 | Mei et al. | |
| 2002/0184310 A1 | 12/2002 | Traversat et al. | |
| 2003/0043846 A1 | 3/2003 | Purpura et al. | |
| 2003/0163702 A1 | 8/2003 | Vigue et al. | |
| 2003/0182425 A1 | 9/2003 | Kurakake | |
| 2003/0200252 A1 | 10/2003 | Krum | |
| 2003/0208599 A1 | 11/2003 | Asano et al. | |
| 2004/0015608 A1 | 1/2004 | Ellis et al. | |
| 2004/0028209 A1 | 2/2004 | Fleming et al. | |
| 2004/0078622 A1 | 4/2004 | Kaminsky et al. | |
| 2004/0151500 A1 | 8/2004 | Misawa et al. | |
| 2004/0193461 A1 | 9/2004 | Keohane et al. | |
| 2004/0215780 A1 | 10/2004 | Kawato | |
| 2005/0057521 A1* | 3/2005 | Aull | G06F 3/023 |
| | | | 345/172 |
| 2005/0060553 A1* | 3/2005 | Allen | 713/182 |
| 2005/0160269 A1* | 7/2005 | Akimoto | H04L 63/0272 |
| | | | 713/171 |
| 2005/0165921 A1 | 7/2005 | Abadir et al. | |
| 2005/0198634 A1* | 9/2005 | Nielsen et al. | 718/100 |
| 2006/0041745 A1 | 2/2006 | Parnes | |
| 2006/0047831 A1 | 3/2006 | Piper et al. | |
| 2006/0101081 A1 | 5/2006 | Lin et al. | |
| 2006/0215652 A1 | 9/2006 | Strandridge et al. | |
| 2006/0228678 A1* | 10/2006 | Tanaka | G09B 21/02 |
| | | | 434/113 |
| 2007/0028106 A1* | 2/2007 | Lauter | H04L 9/0844 |
| | | | 713/171 |
| 2007/0033403 A1* | 2/2007 | Lauter | H04L 9/0847 |
| | | | 713/171 |
| 2007/0180227 A1* | 8/2007 | Akimoto | H04L 63/1408 |
| | | | 713/153 |
| 2007/0226743 A1 | 9/2007 | Takahashi | |
| 2007/0234428 A1 | 10/2007 | Rash | |
| 2007/0256078 A1 | 11/2007 | Falk et al. | |
| 2007/0260538 A1 | 11/2007 | Deaton et al. | |
| 2008/0046758 A1* | 2/2008 | Cha | G06F 21/57 |
| | | | 713/189 |
| 2008/0075048 A1 | 3/2008 | Suszko | |
| 2008/0086453 A1 | 4/2008 | Fabian | |
| 2008/0141378 A1* | 6/2008 | McLean | 726/26 |
| 2008/0256180 A1 | 10/2008 | Balazich et al. | |
| 2008/0280623 A1 | 11/2008 | Danne et al. | |
| 2008/0301219 A1 | 12/2008 | Thornburg | |
| 2009/0024739 A1 | 1/2009 | Thornburg | |
| 2009/0150534 A1 | 6/2009 | Miller et al. | |

OTHER PUBLICATIONS

"Real-Time Media Flow Protocol Frequently Asked Questions—External", Jul. 2008. http://download.macromedia.com/pub/labs/flashplayer10/flashplayer10_rtmfp_faq_070208.pdf (accessed on May 8, 2009), 5 pages.
"Secure Hash Standard" Federal Information Processing Standards Publication 280-2, Aug. 1, 2002, pp. I-iii and 1-71.
Allman, M. et al., "RFC 2581: TCP Congestion Control", Apr. 1999, to be published by the USPTO, 13 pages.
Andreasson, "Chapter 4.4. TCP Connections", 2001, Downloaded from the internet at http://www.faqs.org/docs/iptables/tcpconnections.html on May 9, 2008, 4 pages.
Aron, et al., "Cluster Reserves: A Mechanism for Resource Management in Cluster-based Network Servers", 2000, Department of Computer Science, Rice University, pp. 90-101, ACM, 13 pages.
Bernstein, "SYN Cookies", downloaded from the internet at http://cr.yp.to/syncookies.html on May 9, 2008, 3 pages.
Co-pending U.S. Appl. No. 11/779,165, filed Jul. 17, 2007.
http://en.wikipedia.org/wiki/BitTorrent_%protocol%29, May 5, 2008, 13 pages.
http://en.wikipedia.org/wiki/Gnutella, Apr. 25, 2008, 8 pages.
http://en.wikipedia.org/wiki/Kazaa, May 3, 2008, 7 pages.
International Search Report and Written Opinion mailed Jun. 27, 2008, in related matter PCT/US2008/053865, 9 pages.
International Search Report and Written Opinion mailed Oct. 28, 2008, in related matter PCT/US2008/063739, 9 pages.
Kaufman et al., "The Secure Media Flow Protocol, Version 1", Amicima, Inc. 2004, pp. 1-14.
Menezes et al., "Handbook of Applied Cryptography," CRC Press, 1996, pp. 321-383, 64 pages.
Office Action mailed Jan. 13, 2010, in related matter U.S. Appl. No. 11/779,165, 21 pages.
Office Action mailed Sep. 3, 2009, in related matter U.S. Appl. No. 11/779,165, 21 pages.
Pai et al, "Locality-Aware Request Distribution in Clusterbased Network Servers", 1998, Department of Electrical and Computer Engineering, Rice University, pp. 205-216, ACM, 13 pages.
Patent Application, filed Feb. 20, 2008, for related U.S. Appl. No. 12/034,649, 29 pages.
Patent Application, filed Jan. 3, 2008, U.S. Appl. No. 11/969,186.
Postel, J., "RFC 768: User Datagram Protocol", Aug. 1980, to be published by the USPTO, 3 pages.
Response filed Sep. 28, 2009 in co-pending U.S. Appl. No. 11/757,126, 23 pages.
U.S. Appl. No. 11/969,186, in Office Action mailed Dec. 16, 2009, 8 pages.
Stewart, "Stream Control Transmission Protocol", Sep. 2007, Network Working Group, Request for Comment 4960, downloaded from the internet at http://www.ietf.org/rfc/rfc4960.txt on May 9, 2008, 150 pages.

\* cited by examiner

SYSTEM AND/OR METHOD FOR CLIENT-DRIVEN SERVER LOAD DISTRIBUTION

CROSS-REFERENCE TO RELATED APPLICATIONS

This application is a divisional application of and claims priority to U.S. application Ser. No. 11/757,126, filed on Jun. 1, 2007. The disclosure of the prior application is considered part of and is incorporated by reference in the disclosure of this application

TECHNICAL FIELD

The subject matter disclosed herein relates to server load distribution.

BACKGROUND

In a typical client-server network topology, a client may receive a requested service and/or resource from any one of several servers capable of providing the requested service and/or resource. A server is typically resource constrained and may be slow to respond to requests from a client if the server is already heavily loaded with other tasks and/or requests. Accordingly, load balancing techniques are typically applied to multiple servers to, for example, direct new requests for server resources to servers that are the least busy or occupied.

To facilitate load balancing among a cluster of servers, for example, a load monitor is typically deployed for routing requests for server resources to servers in the cluster that are least loaded. Here, such a load monitor may track metrics associated with servers to determine the extent to which they are occupied or busy. New requests are then typically routed to the server or servers in the cluster that are the least occupied. Such a system for load balancing among a plurality of servers in a cluster is described in U.S. Pat. No. 7,039,916. Additionally, geographic load balancing systems are typically available to direct client requests to a geographically nearest server having sufficient resources available to provide a requested resource to a client. However, such geographic load balancing systems are typically costly and complex.

BRIEF DESCRIPTION OF THE FIGURES

Non-limiting and non-exhaustive embodiments will be described with reference to the following figures, wherein like reference numerals refer to like parts throughout the various figures unless otherwise specified.

DETAILED DESCRIPTION

Figure 1:
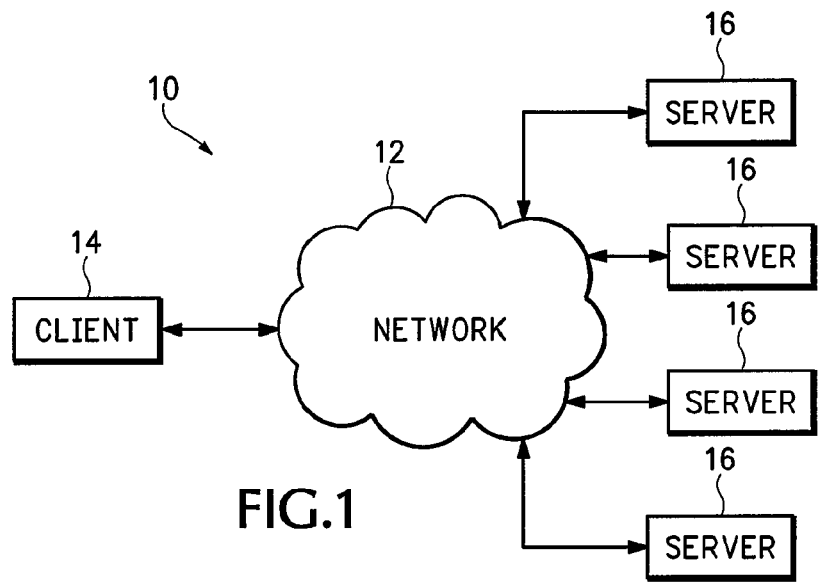
FIG. 1 is a schematic diagram of a network topology for transmitting information between clients and servers according to an embodiment.

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" or "an embodiment" in various places throughout this specification are not necessarily all referring to the same embodiment. Furthermore, the particular features, structures, or characteristics may be combined in one or more embodiments.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and claimed subject matter is not limited in this respect.

"Storage medium" as referred to herein relates to media capable of maintaining expressions which are perceivable by one or more machines. For example, a storage medium may comprise one or more storage devices for storing machine-readable instructions and/or information. Such storage devices may comprise any one of several media types including, for example, magnetic, optical or semiconductor storage media. However, these are merely examples of a storage medium and claimed subject matter is not limited in these respects.

Unless specifically stated otherwise, as apparent from the following discussion, it is appreciated that throughout this specification discussions utilizing terms such as "processing," "computing," "calculating," "selecting," "forming," "enabling," "inhibiting," "identifying," "initiating," "obtaining," "hosting," "maintaining," "representing," "modifying," "receiving," "transmitting," "establishing," "determining" and/or the like refer to the actions and/or processes that may be performed by a computing platform, such as a computer or a similar electronic computing device, that manipulates and/or transforms data represented as physical electronic and/or magnetic quantities and/or other physical quantities within the computing platform's processors, memories, registers, and/or other information storage, transmission, reception and/or display devices. Such actions and/or processes may be executed by a computing platform under the control of machine-readable instructions stored in a storage medium. Further, unless specifically stated otherwise, process described herein, with reference to flow diagrams or otherwise, may also be executed and/or controlled, in whole or in part, by such a computing platform.

A "computer program" as referred to herein relates to an organized list of instructions that, when executed, causes a computing platform and/or machine to behave in a predetermined manner. Here, for example, a computer program may comprise machine-readable instructions that are executable by a computing platform to perform one or more desired tasks. In one particular embodiment, although claimed subject matter is not limited in these respects, a computer program may define inputs and outputs such that execution of the program may provide outputs based, at least in part, on the inputs. However, these are merely examples of a computer program and claimed subject matter is not limited in these respects.

According to an embodiment, a computer program may comprise one or more "software components" comprising instructions that are executable as an integrated part of the computer program. Here, for example, a computer program may comprise multiple software components that are individually created to perform associated functions of the computer program. The different components may then be integrated together to provide a functioning computer program. However, these are merely examples of a computer program and claimed subject matter is not limited in these respects.

An "application" as referred to herein relates to a computer program or group of computer programs capable of providing a desired result and/or action. In a particular embodiment, for example, such an application may comprise one or more computer programs that perform tasks in connection with providing a service and/or resource to a user. For example, although claimed subject matter is not limited in these respects, an application may comprise one or more end-user computer programs such as database programs, spreadsheets, word processors, computer programs that are accessible through a network browser, electronic mail, interactive games, video and/or image processing programs, media presentation programs, calendars, financial application software, inventory control systems and/or the like. However, these are merely examples of an application and claimed subject matter is not limited in these respects.

In one embodiment, a computing platform may comprise one or more "communication adapters" to enable communication between processes executing on the computing platform and a network. Such a communication adapter may comprise a device capable of transmitting information to and/or receiving information from a communication channel and/or data link. In one particular embodiment, for example, a communication adapter may be capable of transmitting information to and/or receiving information from a data transmission medium according to a predefined communication protocol. However, this is merely an example of a communication adapter and claimed subject matter is not limited in this respect.

A "network" as referred to herein relates to a plurality of devices capable of communicating through transmission of information over data transmission media. In a particular example, a network may transmit data between devices over data links according to one or more communication protocols. However, this is merely an example of a network according to a particular embodiment and claimed subject matter is not limited in this respect.

A "client" as referred to herein relates to a process that is capable of communicating with other processes through a network to perform one or more functions or tasks. For example, a client may comprise one or more application programs hosted on a computing platform capable of transmitting information to and/or receiving information from a network through a communication adapter. However, this is merely one example of an implementation of a client according to a particular embodiment and claimed subject matter is not limited in this respect.

A "server" as referred to herein relates to a process that is capable of providing a service and/or resource to other processes, such as clients, in communication with the server over a network. In one particular example, a server may comprise one or more application programs hosted on a computing platform capable of transmitting information to and/or receiving information from a network through a communication adapter. However, this is merely one example of an implementation of a server according to a particular embodiment and claimed subject matter is not limited in this respect.

A "session" as referred to herein relates to period during which processes communicate over a network to perform one or more tasks, operations and/or functions. In one particular embodiment, a session may be established between a client and a server for the purpose of providing one or more resources and/or services to the client. For example, such a client and server may be adapted to communicate through the transmission of datagrams and/or packets according to a protocol. In a particular embodiment, such a session may be established according to a particular communication protocol enabled by a network employing network, data link and physical layer protocols for transmission of information between processes according to associated addresses.

The use of a load balancing monitor for load balancing among servers typically entails the use of a dedicated network appliance to monitor network traffic between a network and servers in a cluster of servers. This typically also requires server resources to be closely located within a geographical area and to be connected to the load balancing monitor. Accordingly, the use of such a load balancing monitor may be ineffective at efficiently allocating server resources that are geographically dispersed. As pointed out above, geographic load balancing solutions may enable allocation of server resources that are geographically dispersed. However, such systems are complex to set and administer, and often require reconfiguration if a network environment changes. According to a particular embodiment, a client to receive a service and/or resource may select from among a plurality of servers to provide that service and/or resource based, at least in part, on a measurement of "responsiveness" of such servers in a manner that obviates the need for a dedicated load balancing monitor and enables efficient allocation of server resources that are geographically dispersed. Here, responsiveness of a server may be caused by multiple factors such as, for example, availability of computing resources at the server to respond to client requests, and delays associated with transmitting information in a network between the server and a client. However, these are merely examples of factors that may determine a responsiveness of a server and claimed subject matter is not limited in this respect.

Responsiveness of a server may be measured based, at least in part, on a round-trip delay between transmission of a message from a client to the server and receipt of a response message at the client. A first portion of the round-trip delay may comprise a delay associated with processing a message received at the server and transmitting a response message from the server. Here, a server that is heavily loaded with other tasks may incur a longer delay in processing such a message than a server that is not as heavily loaded. A second portion of the round-trip delay may comprise a delay associated with transmitting messages between a client and a server over network infrastructure. For example, transmitting messages between a client and a first server may incur a shorter delay than a delay associated with transmitting message between a client and a second server which are geographically further apart from one another than the client and the first server.

FIG. 1 is a schematic diagram of a system 10 that is capable of establishing a session between a client 14 and one or more servers 16 over a network 12. Network 12 may employ data links (not shown) comprising one or more data transmission mediums such as, for example, cabling (e.g., fiber optic, twisted wire pair, coaxial), satellite transmission links or terrestrial wireless transmission links. However, these are merely examples of data transmission media that may be used for transmitting information in a network and claimed subject matter is not limited in this respect. Additionally, network 12 may employ one or more communication protocols for transmitting information between a source and a destination such as, for example, an Internet Protocol (IP), asynchronous transfer mode (ATM) and/or communication protocols adapted for use on wireless transmission links. However, these are merely examples of communication protocols that may be used for transmitting information between a source and a destination in a network and claimed subject matter is not limited in these respects. In particular embodiments, network 12 may comprise one or more network topologies and/or configurations such as, for example, one or more local area networks, one or more Intranets, the Internet, wireless carrier infrastructure Internet versus Intranet, and/or wireless carrier infrastructure, just to name a few examples.

According to an embodiment, client 14 may comprise one or more processes hosted on a computing platform that is communicatively coupled to network 12 by a communication adapter (not shown). Similarly, servers 16 may comprise processes hosted on one or more computing platforms connected to network 12 by an associated communication adapter. In particular embodiments, each server 16 may be hosted on its own associated computing platform which is distinct from computing platforms hosting other servers 16. Alternatively, two or more servers may be hosted on a single computing platform.

According to an embodiment, client 14 may select a server from among servers 16 to provide a service by, for example, establishing a session through which client 14 and server 16 may communicate over network 12. In particular embodiments, although claimed subject matter is not limited in this respect, a server may comprise a print server adapted to process print jobs, web server, email server, content server adapted to distribute audio or video content (e.g., through streaming) such as, for example, the Adobe® Flash Media Server sold by Adobe Systems Inc. and/or other servers capable of streaming audio and/or video content. Client 14 may comprise any one of several application programs hosted on a computing platform such as, for example, email applications, web browsers, document processing programs, media players such as the Adobe® Flash Player sold by Adobe Systems Inc., and/or the like. Here, it should be understood that client 14 may be hosted and/or executed on any one of several devices capable of communicating with a network such as, for example, personal computers, mobile telephones, set-top boxes, Internet-connected televisions, home audio/video entertainment systems, personal digital assistants, just to name a few examples.

According to an embodiment, client 14 may select a server 16 to provide a resource and/or service based, at least in part, on a responsiveness of the selected server which is measured by client 14. For example, client 14 may select a server 16 that is the most responsive from among servers 16 measured based, at least in part, on one or more responses to messages transmitted substantially simultaneously to servers 16 from client 14. As pointed out above, responsiveness of a server 16 may result from, at least in part, an availability of computing resources at server to respond to a request from client 14. For example, if a server 16 is currently committed to providing resources to satisfy other requests (e.g., from other clients), such a server 16 may have limited remaining resources to respond to the request from client 14.

Also as pointed out above, responsiveness of a server 16 may result from, at least in part, delays and/or throughput associated with network 12 in transmitting information between client 14 and such a server 16. Here, for example, portions of network 12 may be more robustly configured to handle network traffic than other portions. Also, certain events may affect delays and/or throughput associated with transmitting information between client 14 and such a server 16 such as, for example, other demands of network resources and equipment outages, just to name a few examples.

According to an embodiment, although claimed subject matter is not limited in this respect, client 14 is adapted to transmit a plurality of initiation messages over network 12 to servers 16 substantially simultaneously. Client 14 may determine a responsiveness of servers 16 based, at least in part, on any responses received from servers 16 to the substantially simultaneously transmitted initiation messages. Client 14 may determine a responsiveness of a server based, at least in part, on a delay between transmitting initiation messages and receipt of a response to an initiation message from the server. Here, for example, client 14 may select a most responsive server 16 to establish a session if a response from the selected server 16 to the substantially simultaneously transmitted initiation messages is the earliest received response.

Figure 2:
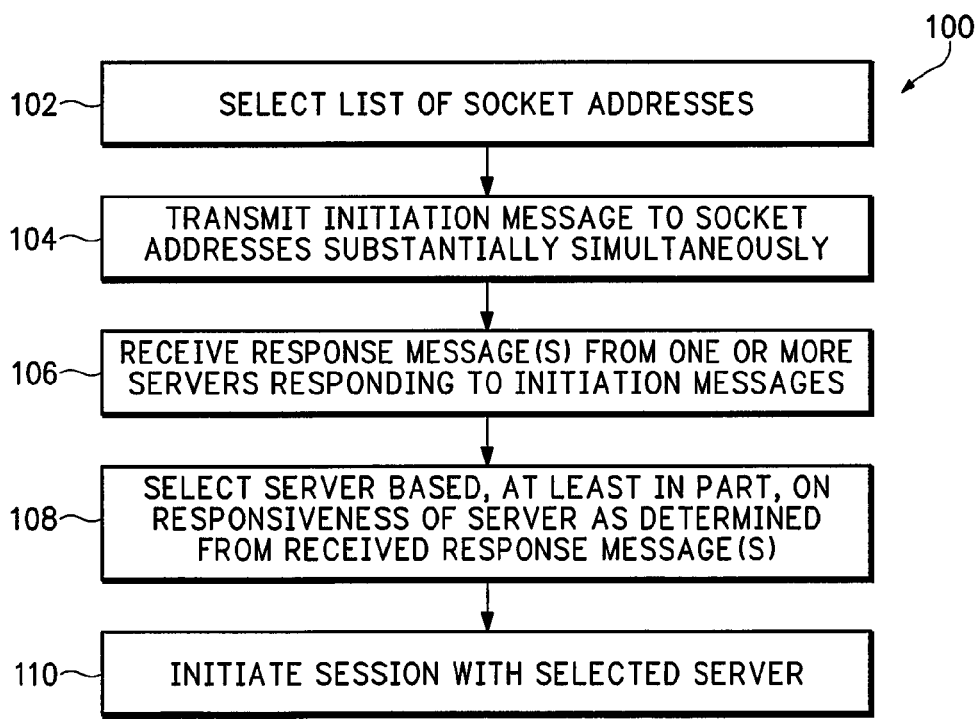
FIG. 2 is a flow diagram of a process associated with actions of a client for initiating a session with a server according to an embodiment.
Figure 3:
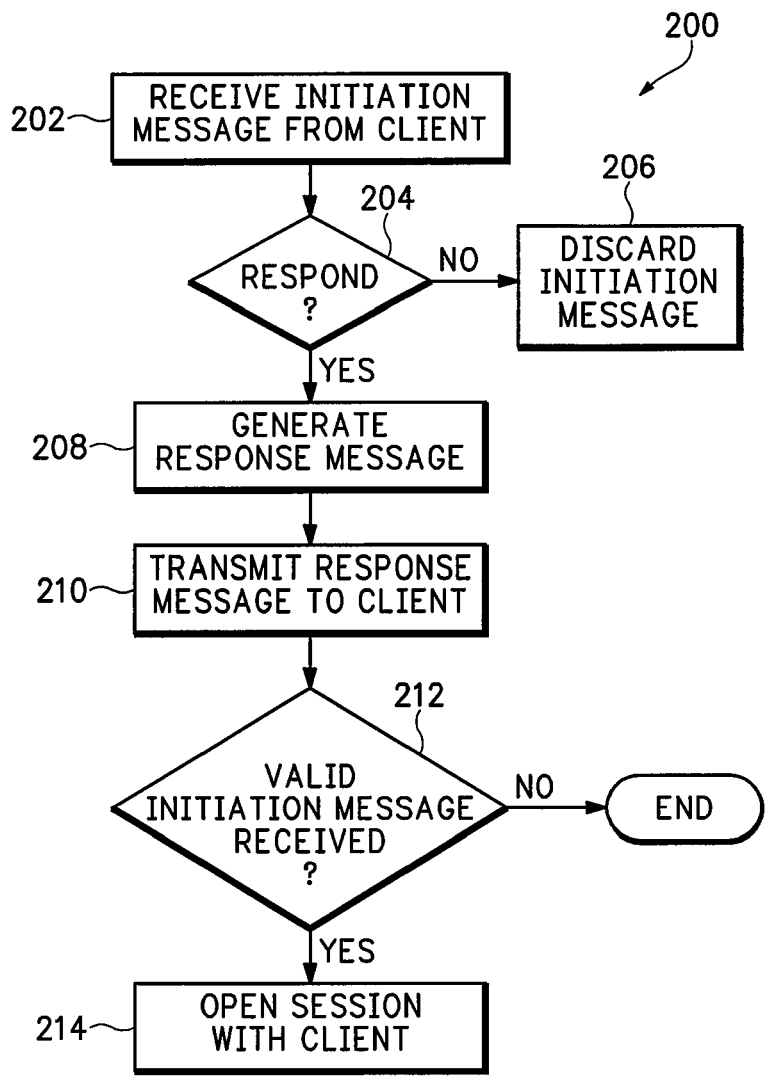
FIG. 3 is a flow diagram of a process associated with actions of a server which is responsive to a request for a service from a client device according to an embodiment.

FIG. 2 is a flow diagram of a process 100 associated with actions of a client for initiating a session with a server according to an embodiment. FIG. 3 is a flow diagram of a process 200 associated with actions of a server device for responding to messages from a client attempting to initiate a session. In one particular embodiment, although claimed subject matter is not limited in this respect, a client and servers may employ messages defined in the Secure Media Flow Protocol, Version 1.2, Dec. 14, 2005 (hereinafter "Media Flow Protocol" or "MFP"). As illustrated below, a client may employ MFP to establish a session with a server selected from two or more servers through an exchange of messages in datagrams transmitted through a network according to a User Datagram Protocol (UDP) (e.g., over Internet Protocol (IP) packets). While particular examples provided herein establish a session between a client and a server using the MFP, it should be understood that such implementations are merely examples of establishing a session between a client and a server provided for the purpose of illustration, and that claimed subject matter is not limited to such implementations. Features described herein may be implemented using different communication protocols without deviating from claimed subject matter.

According to an embodiment, a client may maintain a data structure identifying servers that are capable of providing resources and/or services. In a particular example, such a data structure may associate socket addresses with servers where a socket address may comprise, for example, information combining an IP address and a UDP port number. At block 102, a client may identify servers (e.g., servers 16) capable of providing a particular desired resource and/or service through a session with such a client. Such a particular desired resource and/or service may comprise, for example, any of the above identified resources and/or services, for example. The identified servers may then be associated with a list of selected socket addresses from the data structure. For a particular resource and/or service, such as those provided by a print server or a media content server, for example, such a data structure may associate such a resource and/or service with socket address of servers that are capable of providing that particular resource and/or service.

At block 104, a client 14 may transmit initiation messages to servers selected at block 102 substantially simultaneously. According to an embodiment, such initiation messages may be addressed according to socket addresses associated with servers identified at block 102 and comprise, for example, a unique tag identifying the particular request from such a client. Such a unique tag may comprise, for example, a pseudo random number and/or sequence of bytes generated by a client using any one of several techniques. In one particular example, an initiation message transmitted at block

104 may comprise an "Initiator Hello" or "IHello" message defined according to the aforementioned MFP, for example. Again, it should be understood that this is merely one example of how an initiation message may be transmitted to a server according to a protocol in a particular example and claimed subject matter is not limited in this respect.

FIG. 3 is a flow diagram of a process 200 hosted on a server which is responsive to an initiating message transmitted from a client (e.g., at block 104 in FIG. 2). For example, at block 202, a server may receive an initiation message from a client addressed according to a socket address associated with the server and comprising a unique tag generated by the client generating the initiation message. At diamond 204, a server may determine whether to respond to the received initiation message. Rather than respond to the received initiation message, a server may discard the received initiation message if, for example, the initiation message is from an unauthorized client or the server is otherwise unavailable to engage in a session with the client. Alternatively, a server may discard the received message as an implementation of a statistical approach to discard the received message with increasing likelihood as the server becomes increasingly loaded. Here, under certain conditions, a server may more likely discard a request rather than provide a delayed response.

At block 208, a server may generate a response message responsive to an initiation message received from a client at block 202 comprising information identifying the received initiation message and additional information associated with the server. For example, such a response message may comprise a tag extracted from the received initiation message and a cookie generated by the server based, at least in part, on an address of the client (e.g., from a source address in a received datagram encapsulating the received initiation message), current time and/or secret information known to the server. Here, such a cookie may be generated from a hash combining the aforementioned address of the client, current time and/or secret information, for example. A responsive message generated at block 208 may also include a cryptographic certificate associated with the server, for example.

At block 210, a server may transmit a response generated at block 208 to a client according to the client's address. In a particular embodiment, the server may format the response message as a "Responder Hello" or "RHello" message defined according to the aforementioned MFP, for example. Again, it should be understood that this is merely one example of how a response message may be formatted for transmission to a client in response to receipt of an initiation message according to a protocol in a particular example, and claimed subject matter is not limited in this respect.

Returning to FIG. 2, at block 106, a client may receive one or more response messages from one or more servers responsive to initiation messages transmitted at block 104. In a particular example, such message received at block 106 may comprise response messages transmitted by a server at block 210 as illustrated above according to a particular example. Here, by including the tag of a received initiation message "echoed" back from a client, a received response message may be readily associated with initiation messages transmitted at block 104. Accordingly, at block 106, a client may associate received response messages with initiation messages transmitted substantially simultaneously at block 104.

According to an embodiment, at block 108 a client may select a server (for initiating a session) based, at least in part, on response messages received at block 106. Here, block 108 may select a server based, at least in part, on its responsiveness to messages transmitted at block 104. For example, block 108 may select a most responsive server as being the server transmitting the earliest response message received at block 106 associated with particular initiation messages. In a particular embodiment where a response message includes a tag echoed back from a particular set of initiation messages transmitted substantially simultaneously at block 104, for example, block 108 may associate such an echoed tag with the particular set of initiation messages. Here, a client may select the most responsive server as, for example, the server transmitting the earliest received response message having an echoed tag associated with such a particular set of initiation messages. In a particular implementation, a client may discard any reference to an original tag upon receipt of such an earliest response message so that such subsequent response messages are not recognized. It should be understood, however, that this is merely one example of how the responsiveness of one or more servers may be evaluated according to a particular embodiment and claimed subject matter is not limited in this respect.

Upon selecting a server at block 108 from among a plurality of servers, a client may initiate a session with the selected server at block 110. For example, such a client may transmit a session initiation message to the socket address of the selected server containing, for example, a cookie from a response message received from the selected server and session negotiation information. Such session negotiation information may include, for example, a session identifier to be used by the selected server in labeling packets transmitted to the client during the session. Such session negotiation information may also include keying information to be used in negotiating a secure communications channel during the session. Such keying information may comprise, for example, an initiator certificate associated with the client, initiator session key component and/or a digital signature. In a particular implementation, a client may format such a session initiation message as an "Initiating Initial Keying" or "IIKeying" message defined according to the aforementioned MFP, for example.

By receiving a cookie echoed back in a session initiation message transmitted at block 110, a server may determine whether the received session initiation message is valid at diamond 212 by comparing the echoed cookie with the cookie formed at block 208 and transmitted in a response message at block 210. Upon receipt of such a valid session initiation message, a server at block 214 may open a session by, for example, responding to a valid session initiation message with transmission of a session initiation response message to the requesting client. Such a session initiation response message may comprise, for example, a session identifier to be used by the client in labeling packets transmitted to the server during the session and keying information. Such keying information may include, for example, a responder session key component. In a particular implementation, a server may format such a session initiation response message as a "Responder Initial Keying" or "RIKeying" message defined according to the aforementioned MFP, for example.

In a particular embodiment, a server at block 210 may deliberately delay transmitting a response message to a requesting client based upon certain conditions such as, for example, a condition where the server is heavily loaded with requests from other clients. With such a delayed response, the server may less likely appear to be the most responsive server, for example.

In a particular embodiment where a session initiation message from a client to a selected server comprises a initiator session key component and a session initiation response message from a selected server to the client, such session key components may collectively contribute to an encryption key to be used in maintaining security of information in packets transmitted during a session. For example, such an encryption key may be determined from a concatenation of the session key components or a hash function based on the session key components.

In embodiments illustrated above, unless a server is selected by a client (e.g., upon receipt of a session initiation message) a server may employ few computational resources to establishing a connection with the client. By merely preparing and transmitting a response message to a requesting client at block 208, a server need only maintain a copy of an associated cookie that is included in the response message and/or information for computing the cookie for a limited time period (e.g., long enough to validate an initiation message at diamond 212).

In one embodiment, a server may discard the cookie included in a response message transmitted at block 210 and then recreate the cookie in response to a session initiation message from a client. For example, upon receipt of a session initiation message from a client at a server, diamond 212 may compute a cookie based upon secret information used by the server to create a cookie included in a response message at block 208, source address of the received session initiation message and current time. Here, the server may maintain a current time in discrete increments (e.g., 30 seconds). If diamond 212 can match the computed cookie with information in the received session initiation message, diamond 212 may determine that the received session initiation message is valid. If no match is found, diamond may compute a second cookie based upon the secret information, source address of the received session initiation message and a previous current time. If diamond 212 can not match the second cookie with information in the received session initiation message, the session initiation message may be determined to be invalid.

By discarding a cookie included in a response message, a server remains stateless until determination of receipt of a valid session initiation message at diamond 212. Accordingly, a client need only establish a single session and/or logical connection with a selected server in the process of selecting the server from among a plurality of servers.

In particular embodiments, it should be understood that a client may initiate transmission of initiation messages at block 102 in a network through one or more communication adapters of a computing platform hosting the client. As such, multiple messages to be transmitted substantially simultaneously may be queued in a buffer for transmission in a data transmission medium. Here, while some initiation messages may actually commence transmission prior to other messages, delays in the transmission of one initiation message relative to another initiation message may be insignificant with respect to measuring responsiveness of a server to such an initiation message at blocks 106 and 108, for example.

According to an embodiment, a single computing platform may host multiple servers capable of providing a resource and/or service to a client. Here, it should be understood that such multiple servers may have distinct socket addresses, permitting a client to separately transmit multiple initiation messages to different servers hosted on a single computing platform, and individually select such a server based, at least in part, on receipt of associated response messages without deviating from claimed subject matter.

Figure 4:
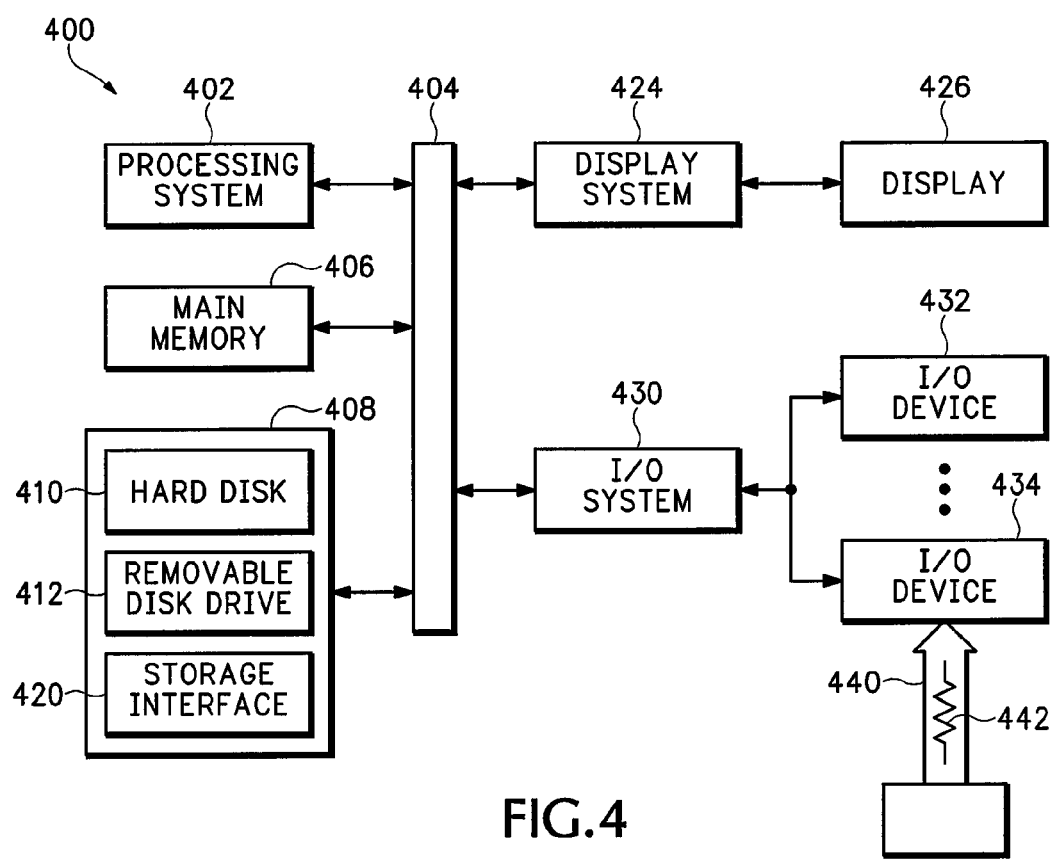
FIG. 4 is a schematic diagram of a computing platform according to an embodiment.

FIG. 4 is a schematic diagram of a computing platform 400 that may host a server or client as illustrated above according to a particular embodiment. Computing platform 400 includes a processing system 402, which may include a central processing unit such as a microprocessor or microcontroller for executing programs to control tasks in the machine 400, thereby enabling features and function described above. Moreover, the processing system 402 may include one or more additional processors, which may be discrete processors or may be built in to the central processing unit.

Processing system 402 is coupled with a bus 404, which is adapted to transmit signals between processing system 402 and other devices. Computing platform 400 may include embedded controllers, such as, for example, Generic or Programmable Logic Devices or Arrays (PLD, PLA, GAL, PAL), Field Programmable Gate Arrays (FPGA), Application Specific Integrated Circuits (ASIC), single-chip computers, smart cards, or the like.

Computing platform 400 may include a main memory 406 and one or more cache memories, and may also include a secondary memory 408. These memories provide storage of machine-readable instructions and data for computer programs to be executed by processing system 402. Here main memory 406 and secondary memory 408 may comprise one or more of the above identified storage media. In the particular illustrated implementation, secondary memory 408 may include, for example, a hard disk drive 410, a removable storage drive 412 and/or a storage interface 420.

Computing platform 400 may also include a display system 424 for connecting to a display device 426 and an input/output (I/O) system 430 (e.g., one or more controllers or adapters for providing interface functions) for connecting to one or more I/O devices 432 through 434. I/O system 430 may provide a communications interface, which allows information to be transmitted, in the form of signals 442, between computing platform 400 and external devices, networks or information sources. Signals 442 may be transmitted in any type of transmission media (e.g., as electronic, electromagnetic or optical transmission media) to be received via a channel 440 (e.g., wire, cable, optical fiber, phone line, infrared (IR) channel, radio frequency (RF) channel, etc.). A communications interface used to receive these signals 442 may comprise a network interface controller designed for a particular type of network, protocol and/or transmission medium, and/or may be designed to serve multiple networks, protocols and/or channel media.

Machine-readable instructions may be stored in computing platform 400 and/or delivered to computing platform 400 over a communications interface. It should be understood that computing platform 400 is merely an example of a computing platform capable of hosting a client or a server and that other systems, architectures, and modifications and/or reconfigurations may also be used without deviating from claimed subject matter.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. A method comprising:
receiving, at a server hosted on a computing platform, an initiation message sent by a client to multiple servers over a network, the multiple servers including the server hosted on the computing platform, wherein the initiation message requests a resource or a service and includes a tag identifying the initiation message;

generating, at the server, a response message based on the initiation message, the response message including the tag and a generated cookie;

sending the response message to the client; discarding, at the server, the generated cookie to keep the server stateless with respect to the initiation message after the response message is sent;

receiving a session initiation message from the client, the session initiation message including the generated cookie;

validating the session initiation message based on a comparison of the generated cookie received in the session initiation message and a regenerated version of the generated cookie, where the regenerated version of the generated cookie is created based upon secret information used by the server to create the generated cookie included in the session initiation message and a source address of the session initiation message; and responding to a valid session initiation message with a session initiation response message to the client to open a session, wherein the session initiation response message comprises keying information that includes a responder session key component that is used to form an encryption key used to encrypt packets transmitted during the session.

2. The method of claim 1, further comprising:

receiving, at the server, an additional message before the initiation message, the additional message being another initiation message sent to the multiple servers over the network; and based on a statistical assessment with respect to server load, discarding the additional message without response or delaying a response to the additional message.

3. The method of claim 1, where generating the response message comprises generating the response message including a cryptographic certificate associated with the server.

4. The method of claim 1, where the response message sent from the server indicates a responsiveness of the server.

5. The method of claim 4, where the responsiveness of the server results from, at least in part, delays or throughput associated with the network in transmitting information between the client and the server.

6. The method of claim 1, where the response message sent from the server is the earliest response message received by the client in response to the initiation message sent by the client to the multiple servers.

7. The method of claim 1, where the server is at least one server selected from the group consisting of a print server adapted to process print jobs, a web server, an email server, and a content server adapted to distribute audio or video content.

8. The method of claim 1, where the regenerated version of the generated cookie is created based upon a current time.

9. The method of claim 1, comprising:

generating a second cookie based upon secret information used by the server to create the generated cookie included in the session initiation message, a source address of the session initiation message, and a previous current time;

comparing the second cookie with information in the received session initiation message; and based upon a result of the comparing, determining that the session initiation message is invalid.

10. A system comprising:

a communication adapter configured to transmit information to and receive information from a network; and a processing system coupled with the communication adapter, the processing system configured to host a server to perform operations comprising:

receiving an initiation message sent by a client to multiple servers over the network, the multiple servers including the server, wherein the initiation message requests a resource or service and includes a tag identifying the initiation message;

generating, at the server, a response message based on the initiation message, the response message including the tag and a generated cookie;

sending the response message to the client; discarding, at the server, the generated cookie to keep the server stateless with respect to the initiation message after the response message is sent;

receiving a session initiation message from the client, the session initiation message including the generated cookie;

validating the session initiation message based on a comparison of the generated cookie received in the session initiation message and a regenerated version of the generated cookie, where the regenerated version of the generated cookie is created based upon secret information used by the server to create the generated cookie included in the session initiation message and a source address of the session initiation message; and responding to a valid session initiation message with a session initiation response message to the client to open a session, wherein the session initiation response message comprises keying information that includes a responder session key component that is used to form an encryption key used to encrypt packets transmitted during the session.

11. The system of claim 10, were the processing system is configured to:

receive an additional message before the initiation message, the additional message being another initiation message sent to the multiple servers over the network; and based on a statistical assessment with respect to server load, discard the additional message without response or delaying a response to the additional message.

12. The system of claim 10, where generating the response message comprises generating the response message including a cryptographic certificate associated with the server.

13. The system of claim 10, where the response message sent from the server indicates a responsiveness of the server.

14. The system of claim 13, where the responsiveness of the server results from, at least in part, delays or throughput associated with the network in transmitting information between the client and the server.

15. The system of claim 10, where the response message sent from the server is the earliest response message received by the client in response to the initiation message sent by the client to the multiple servers.

16. The system of claim 10, where the server is at least one server selected from the group consisting of a print server adapted to process print jobs, a web server, an email server, or a content server adapted to distribute audio or video content.

17. The system of claim 10, where the regenerated version of the generated cookie is created based upon a current time.

18. The system of claim 10, comprising:

generating a second cookie based upon secret information used by the server to create the generated cookie included in the session initiation message, a source address of the session initiation message, and a previous current time;

comparing the second cookie with information in the received session initiation message; and based upon a result of the comparing, determining that the session initiation message is invalid.

19. A non-transitory storage medium encoding machine-readable instructions configured to cause a server hosted on a computing platform to perform operations comprising:

receiving, at the server hosted on the computing platform, an initiation message sent by a client to multiple servers over a network, the multiple servers including the server hosted on the computing platform, wherein the initiation message requests a resource or a service and includes a tag identifying the initiation message;

generating, at the server, a response message based on the initiation message, the response message including the tag and a generated cookie;

sending the response message to the client;

discarding, at the server, the generated cookie to keep the server stateless with respect to the initiation message after the response message is sent;

receiving a session initiation message from the client, the session initiation message including the generated cookie;

validating the session initiation message based on a comparison of the generated cookie received in the session initiation message and a regenerated version of the generated cookie, where the regenerated version of the generated cookie is created based upon secret information used by the server to create the generated cookie included in the session initiation message and a source address of the session initiation message; and responding to a valid session initiation message with a session initiation response message to the client to open a session, wherein the session initiation response message comprises keying information that includes a responder session key component that is used to form an encryption key used to encrypt packets transmitted during the session.

20. The storage medium of claim 19, were the machine-readable instructions are configured to cause the server to perform operations comprising:

receiving an additional message before the initiation message, the additional message being another initiation message sent to the multiple servers over the network; and based on a statistical assessment with respect to server load, discarding the additional message without response or delaying a response to the additional message.

* * * * *